June 29, 1971 T. E. SKARADA ET AL 3,590,091

CRYSTALLIZATION AND PURIFICATION OF 2,6-DMN

Filed Aug. 16, 1968 4 Sheets-Sheet 4

CRYSTALLIZER

INVENTORS
THOMAS E. SKARADA
JOHN A. HEDGE

BY: *Kenneth W. Johnson*

ATTORNEY

United States Patent Office 3,590,091
Patented June 29, 1971

3,590,091
CRYSTALLIZATION AND PURIFICATION OF 2,6-DMN
Thomas E. Skarada, Upper Providence Township, Delaware County, Pa., and John A. Hedge, Wilmington, Del., assignors to Sun Oil Company, Philadelphia, Pa.
Filed Aug. 16, 1968, Ser. No. 753,176
Int. Cl. C07c 7/14
U.S. Cl. 260—674                        7 Claims

ABSTRACT OF THE DISCLOSURE 2,6-dimethylnaphthalene (DMN) can be recovered in high yields and high purity by carefully controlling the temperature of crystallization at the temperature determined from FIG. 2 at which all 2,6-/2,7-DMN eutectic is soluble in the liquids present. For example, a 495–510° F. catalytic gas oil distillate fraction containing

|  | Wt. percent |
|---|---|
| 2,6-DMN | 25 |
| 2,7-DMN | 28 |
| Other | 47 | will have a eutectic of 2,6-/2,7-DMN in the wt. ratio of .725/1 thus the eutectic represents 48.3% of incoming feed. To use FIG. 2, the wt. percent of eutectic is calculated on total feed, excluding free 2,6-DMN, in this case 50.6 wt. percent eutectic. From FIG. 2, 50.6 eutectic is soluble at 37° C. The temperature of crystallization should be no less than 37° C. ($\pm 2°$ C.) to avoid crystallization of the 2,6-/2,7-eutectic and no more than 37° C. ($\pm 2°$ C.) to avoid dissolving free 2,6-DMN.

BACKGROUND OF THE INVENTION

This invention relates to a process for recovery of 2,6-dimethylnaphthalene. More particularly the invention relates to a process that provides a means of recovery of 2,6-dimethylnaphthalene (DMN) in high purity from mixtures containing 2,7-dimethylnaphthalene.

The recovered isomers are useful for various purposes as known in the art. For example, the 2,6-DMN can be partially oxidized to produce dicarboxylic acid or other oxidation products. The diacid is particularly useful for the preparation of polyesters by the reaction with aliphatic diols such as, ethylene glycol. The resulting polyesters are useful for the preparation of fibers, coatings, and the like.

The usual manner of recovery of 2,6-DMN is from a hydrocarbon feed stock such as that derived from petroleum, coal tar, synthetic tar sand crudes, shale oil, and the like. The feed stock is preferably one containing a substantial amount of dimethylnaphthalenes, in particular, the 2,6-isomer. Typically, the feed stock contains at least 80%, preferably at least 90%, of aromatic hydrocarbons. The content of the 2,6-isomer in the feed stock is typically in the range of from 5 to 40 wt. percent, preferably 10 to 30 wt. percent.

Examples of suitable feed stocks are various highly aromatic fractions produced in petroleum refining and conversion processes. Higher boiling aromatic fractions produced in reforming of petroleum naphtha to produce high octane gasoline, are examples of such feed stocks. Aromatic fractions produced by the thermal cracking of catalytically reformed gasoline; aromatic fractions produced by the catalytic cracking of thermally reformed naphtha; and aromatic concentrates obtained from catalytic gas oil produced in catalytic cracking of petroleum; are additional examples of suitable feed stocks. The latter concentrates can be prepared, for example, by solvent extraction, e.g., with furfural, by selective adsorption, or by other known processes.

The usual procedure for recovering the free 2,6-DMN from the aromatic hydrocarbon feed is to cool the feed to precipitate a solid material containing one or more of the isomers, e.g., the 2,6-DMN in a concentrated but still crude form. The 2,6-DMN then is recrystallized, for example, from methanol. This procedure is repeated until the desired purity is reached. It is now possible, by following the procedure of the present invention, to obtain 2,6-DMN of 95+% purity in the first crystallization thus substantially reducing the number and degree of the subsequent purification steps to obtain 95+% purity necessary for further utilization of the 2,6-DMN.

In order to concentrate a given isomer or isomers in the feed stock, it is usually desirable to obtain a relatively narrow boiling distillate fraction for use as the feed stock for the crystallization. In the case of 2,6-dimethylnaphthalene, a distillate fraction having boiling range of approximately 490 to 515° F., more preferably 495 to 510° F. or some narrower boiling range within the range of 490 to 515° F., is preferred.

SUMMARY OF THE INVENTION

Figure 1:
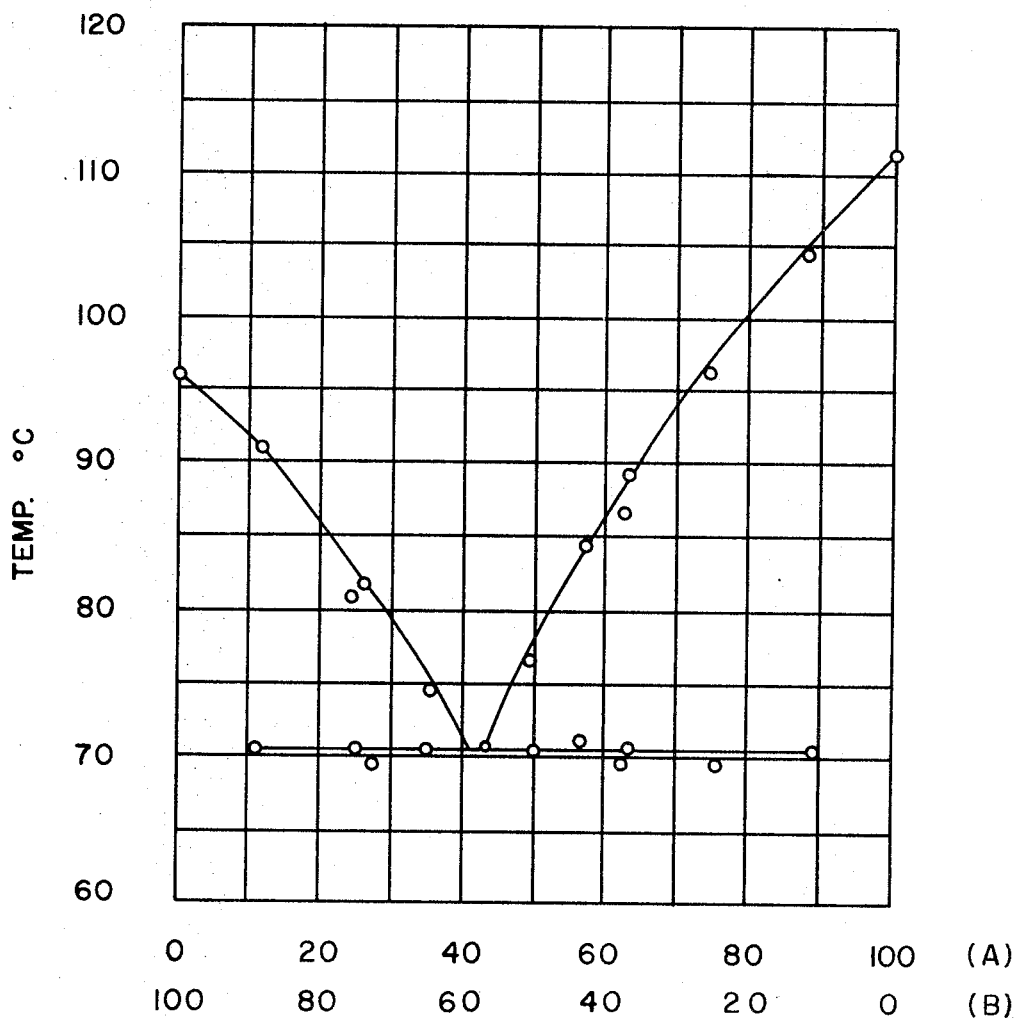
FIG. 1 is a binary phase diagram of the 2,6-DMN-/2,7-DMN eutectic mixture.

The usual procedure for crystallization has been to heat the feed stock to a sufficiently high temperature to obtain solution of normally solid components in the liquid phase. In the case of fractions boiling in the range from 495 to 510° F. and containing 10 to 30 wt. percent of 2,6-dimethylnaphthalene the fraction at room temperature is a slurry containing solid components as well as liquid components. The extent of heating necessary to obtain solution of such solid components may readily be determined by a person skilled in the art and is usually in the range of 80 to 120° F. The temperature varies depending upon the starting material, and in some cases no heating is required to obtain complete solution.

In the past the usual procedure was to cool the feed stock to crystallize solid material constituting a crude concentrate of the isomer or isomers to be recovered. Usually the temperature of crystallization was in the range from —50° C. to 50° C.

When the 2,6-DMN is isolated from a mother liquor also containing 2,7-DMN there will be a 2,6/2,7-DMN eutectic formed. It has been determined that the eutectic forms with the weight ratio of 2,6-; 2,7-DMN being .725:1. The 2,6-DMN that can be recovered from such mixtures, according to the present invention, is that in excess of the 2,6/2,7-eutectic mixture.

In the past, little regard has been paid to the presence of this eutectic in the crystallizations. Usually the eutectic has been one of the major impurities which was the subject of extensive post crystallization purifications such as methanol repulping.

It has now been found that by carrying out the crystallization of 2,6-DMN at specific temperatures determined on the amount of 2,6-/2,7-DMN eutectic present, extremely high yields of high purity 2,6-DMN can be obtained. Briefly stated, the invention is an improvement in the process of recovering 2,6-dimethylnaphthalene from a feed containing 2,6-dimethylnaphthalene and 2,7-dimethylnaphthalene by crystallizing the 2,6-dimethylnaphthalene from said feed at a temperature in the range of —50 to 70° C. wherein the improvement comprises carrying out said crystallization at the temperature determined from FIG. 2 at which the 2,6-/2,7-dimethylnaphthalene eutectic mixture is soluble in the liquid present.

DESCRIPTION OF THE INVENTION

The temperature of crystallization is determined by the amount of 2,7-DMN present. This is so because it has been determined that the 2,7-DMN combines with the 2,6-DMN in the eutectic mixture in the weight ratio of 2,6-/2,7-DMN of .725:1. Thus, in order for any 2,6-DMN to be recovered from a feed it must be present in a weight ratio of greater than .725:1 to 2,7-DMN. The eutectic is extremely difficult to break and so far as the art is presently concerned the eutectic mixture is of little value.

The hit and miss approach of the prior art to crystallization of 2,6-DMN from feed stocks containing 2,7-DMN has resulted either in high contamination of the product with 2,6-/2,7-eutectic when low crystallization temperatures were used to obtain high yields of 2,6-DMN or low yields of 2,6-DMN when high crystallization temperatures were used to obtain high purity 2,6-DMN. The prior art recognized the shortcomings of that approach, but not the source. The impurities including mother liquor adhering to the crystals and 2,6-/2,7-eutectic were removed by methanol repulping. The repulping in an intimate mixing of the 2,6-DMN crystals with mehanol solvent at a temperature in the range of 60-85° F. The mother liquor, the 2,6-/2,7-eutectic and to a lesser extent the 2,6-DMN solids are soluble in the methanol. The amount of methanol solvent required is dependent on the amount of impurities present, thus, by essentially eliminating the 2,6-/2,7-eutectic from crystallizing the present invention allows the use of lower volumes of methanol thus lower loss of 2,6-DMN and, in addition, requires fewer repulpings to obtain the requisite high purity of 2,6-DMN in high yields.

This is true regardless of the method of purification used. For example, the present process provides a superior feed for the melt centrifuging process of purification described in U.S. Pat. 3,485,855 to Peterkin and Scott.

Figure 2:
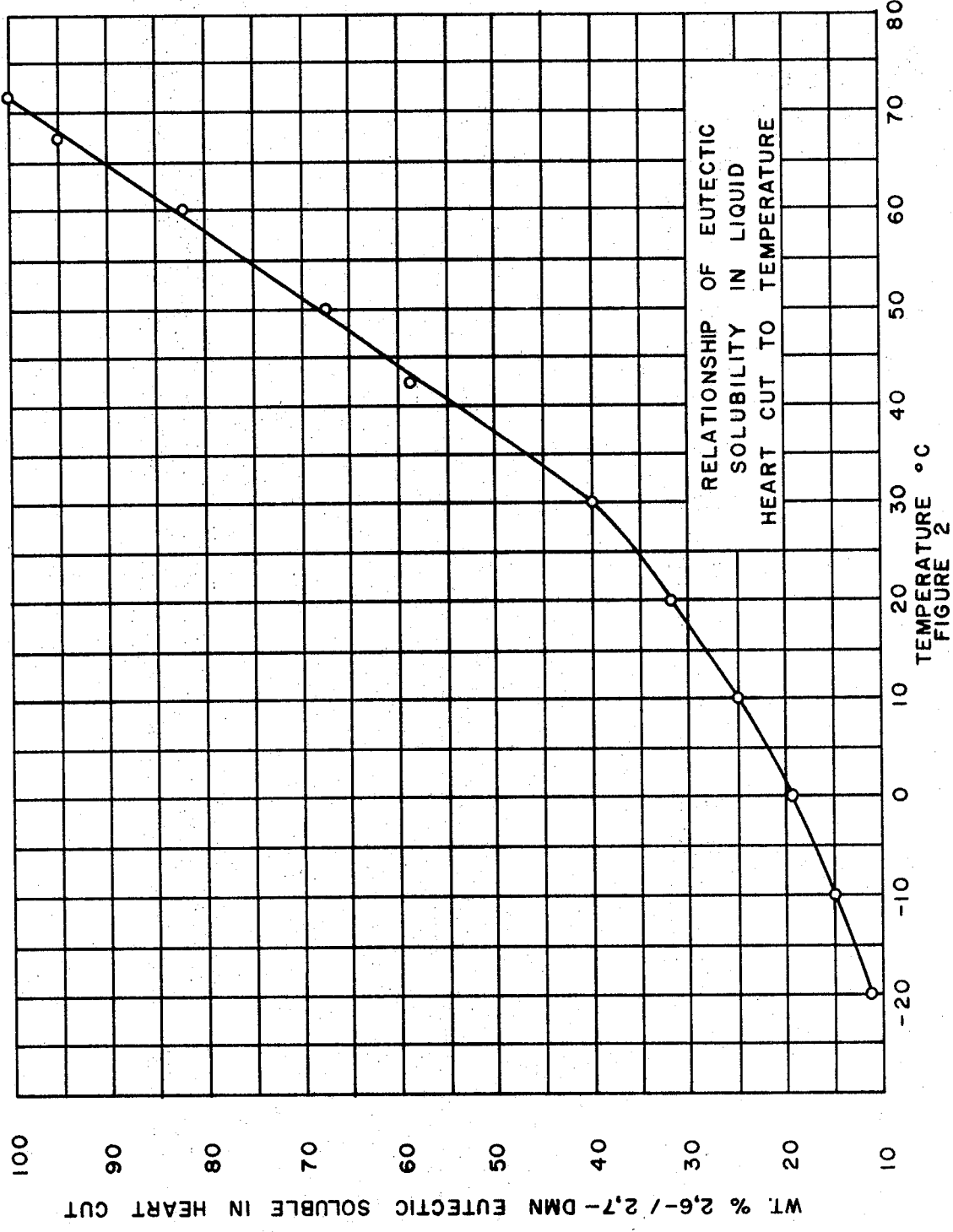
FIG. 2 is a graph showing the weight percent of 2,6-/2,7-DMN eutectic soluble in the liquid portion of the feed stock at a given temperature.

Close temperature control in the crystallization process of the present invention is important. If the temperature of crystallization is appreciably lower than that determined from FIG. 2, then 2,6-/2,7-DMN eutectic will be cocrystallized with the 2,6-DMN thus resulting in the inadequacies of the prior art. If the crystallization temperature is appreciably higher than that determined from FIG. 2 then some of the 2,6-DMN will be solubilized and lower yields will result. Because of the equipment and human limitations, it would be impossible to operate at exactly the temperature which will give optimum results and for that reason and the purposes of the present invention and claims, it is to be understood that the temperature determined from FIG. 2 is equivalent at ±2° C.

The optimum crystallization temperature for a particular feed stock is selected based on the amount of 2,6-/2,7-DMN eutectic mixture present. This is best done by analysis of the feed for the 2,7-DMN and 2,6-DMN present and calculation of the weight percent of eutectic based on 2,7-DMN. FIG. 2, however, is not based on the feed stream concentration, but is more meaningfully related to solubility of the 2,6-/2,7-eutectic at a particular temperature in the liquids present at that temperature, i.e., the mother liquor and the 2,6-/2,7-eutectic, but excluding the crystalline 2,6-DMN. For example, 100 pounds of feed contained:

25# 2,6-DMN
28# 2,7-DMN
47# other liquid aromatics boiling between 495-510° F.

The eutectic contained 42 wt. percent 2,6-DMN and 58 wt. percent 2,7-DMN, i.e., weight ratio of .725:1. Therefore, the total eutectic represented 48.3% of the incoming feed. The optimum temperature for purity and yield is that at which 48.3% of eutectic will be soluble in the 47 pounds of other liquid aromatics. Thus, the weight percent of eutectic to be dissolved is recalculated based on the liquid material remaining at the temperature of crystallization by $$\frac{48.3}{48.3+47} \times 100 = 50.6 \text{ wt. percent}$$

From FIG. 2, 50.6% eutectic is soluble at 37° C. Therefore, the temperature must be at least 37° C. (±2° C.) in order to avoid crystallization of 2,6-/2,7-eutectic and should be no more than 37° C. (±2° C.) if the highest yield of 2,6-DMN is to be obtained.

Figure 3:
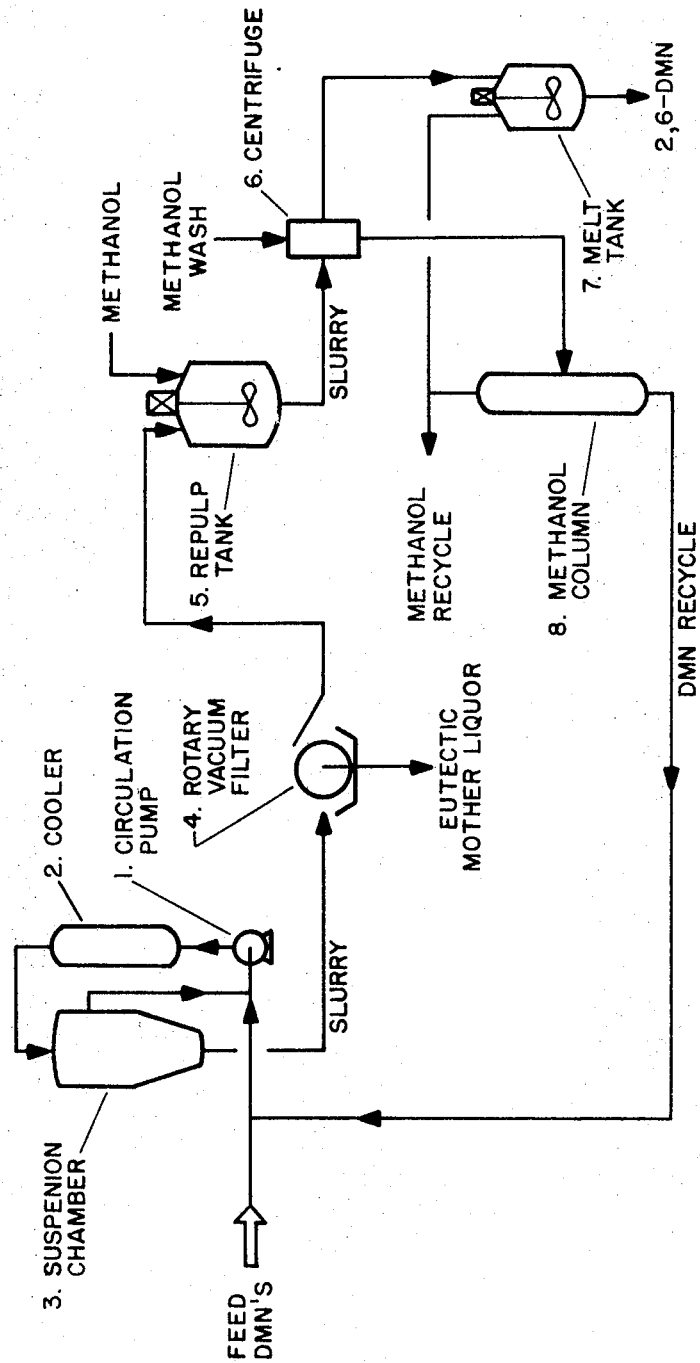
FIG. 3 is a process flow diagram for the crystallization and purification of 2,6-DMN.

Additional understanding of the invention can be gained by reference to FIG. 3 which is a flow diagram of the total process of 2,6-DMN recovery including the present invention. The feed stock is directed into circulation pump 1 and from there into cooler 2, hence into suspension chamber 3. By circulating at a high rate of speed it is possible to carefully control the temperature in the crystallizer. A Struthers-Wells Krystal contact cooling crystallizer is suitable for this type of operation. This equipment allows a one-stage crystallization and a specific temperature of operation. From the crystallizer the feed, which is now a slurry passes to a rotary vacuum filter 4 where most of the liquids are removed. The filter cake retains some mother liquor and is about 35-50 wt. percent solids. The filter cake is passed to the repulp tank 5 and thoroughly agitated with methanol in the weight ratio of about 4:1 methanol to wet 2,6-DMN crystals. The repulped slurry is passed to a centrifuge 6 then to a melt tank 7 where the 2,6-DMN crystals are melted, the methanol vaporized and recycled to the repulping step. Liquid material from centrifuge 6 is distilled in column 8. Recovered methanol is recycled to the repulping step and the bottoms are recycled to the feed stream going into the crystallizer.

In a typical operation, the feed stream was a 495-510° F., catalytic gas oil distillate fraction prepared from a desulfurized aromatic extract from a naphthalene operation. Such a fraction will normally contain 16-24 wt. percent 2,6-DMN. The analysis of three such fractions subjected to the claimed process were:

TABLE I

| Run | Weight percent | | |
|---|---|---|---|
| | 1 | 2 | 3 |
| 2,6-DMN | 18 | 18 | 24 |
| 2,7-DMN | 17 | 15 | 15 |
| Other DMN's | 33 | 35 | 21 |
| Non-DMN's | 32 | 32 | 40 |

In Run 3, for example, the wt. percent of 2,6-/2,7-DMN eutectic based on liquid materials in which the eutectic is to be solubilized, is 29.8 wt. percent. Referring to FIG. 2, it can be seen that temperature of crystallization must be 17° C. Using the same approach, the crystallization temperature of Runs 1 (31% eutectic) and 2 (27.8 eutectic) are 18° C. and 14° C. respectively.

Figure 4:
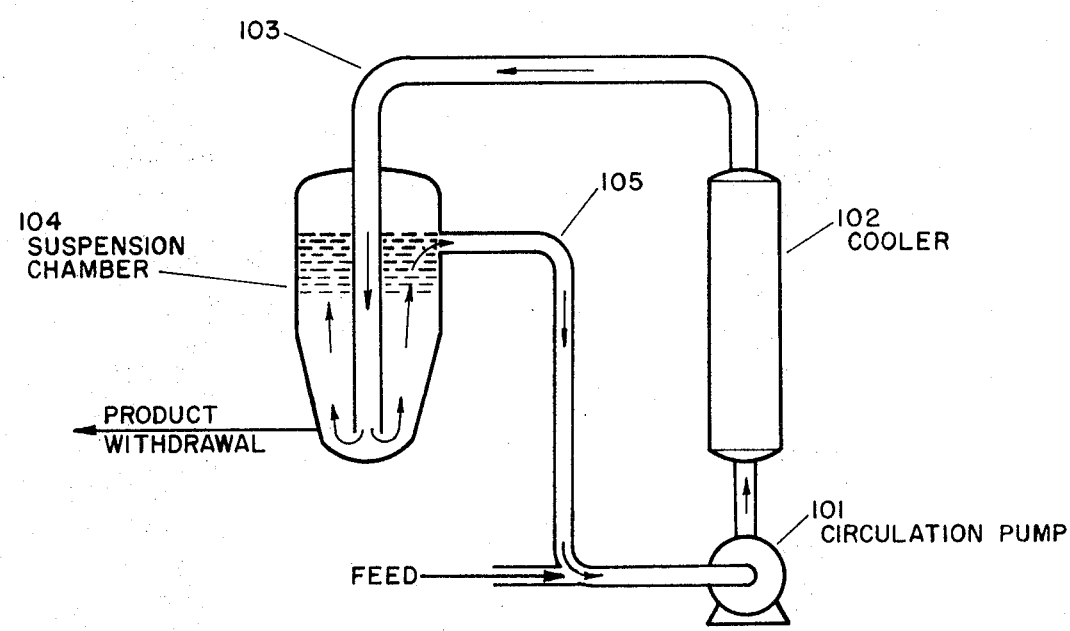
FIG. 4 is a schematic representation of the crystallizer.

A Krystal contact cooling crystallizer was used for the crystallization of 2,6-DMN. FIG. 4 shows the operation of the crystallizer. The feed comes into the system and is rapidly passed through cooler 102, through conduit 103 into suspension chamber 104 and, hence, through 105 back to circulation pump 101. Crystalline material is withdrawn from the suspension chamber and usually further purified. In the instant run, a 1400 gallon crystillizer was employed having a 800-1000 gallon per minute circulation rate through the cooler.

The circulation rate in the crystallizer is a controlling factor in the degree of supersaturation which is in turn the driving force for crystallization. Also, the high circulation rates permit the cooler to operate with a low temperature difference ($\Delta T$) between coolant and process feed, and practically eliminates fouling of the heat transfer surfaces. The supersaturation was maintained between 2.0-2.6 pounds/1000 gal. of feed for each of the three runs.

The temperature of the feed was maintained at 100–120° F. to prevent crystallization of the feed before it enters the crystallizer. This warm feed enters the crystallizer in the crystallizer circulation line and becomes mixed with a large volume of circulating crystal slurry. The resulting mixture remains practically at crystallization temperature. This mixture passes through the cooler where the heat of crystallization and sensible heat of the feed are removed and the solution becomes supersaturated. The supersaturation is released and the crystallization occurs when the solution enters the suspension chamber of the crystallizer. The crystallization period is usually 2 to 7 hours, although satisfactory results can be obtained with other crystallization periods. Seven hours were employed in the instant runs.

Two types of crystals were observed. One type was uniform globular crystals measuring 20–150 microns in length and the second type was needle-like crystals being approximately 40 x 10 microns.

The recovery of free 2,6-DMN from the crystallization was:

TABLE II

| Runs: | Wt. percent free 2,6-DMN |
|---|---|
| 1 | 32 |
| 2 | 40 |
| 3 | 55 |

It can be seen that in any single run that higher percentages of 2,6-DMN recovery are possible with crystallization feeds having higher concentrations of 2,6-DMN.

The recovered slurry from Run 1 was then filtered with a basket centrifuge at about 900 r.p.m. A rotary vacuum filter could, also, be used. The recovered wet crystals contain about 50 wt. percent adhering mother liquor.

The wet crystals were then repulped with methanol at a temperature of 75–80° F. by intimately mixing the wet crystals with methanol in a 400 gal. agitated tank. Four weights of methanol were used for each weight of wet crystals.

The wet crystals were centrifuged at about 900 r.p.m. Then the wet crystals containing 20–39 wt. percent methanol were melted at 110° C.

The vaporized methanol can be recovered and recycled to the repulp step. The effluent from the centrifuging of the methanol wet crystals can also be distilled to recover methanol which is recycled to the repulp and the bottoms recycled to the crystallizer. In this manner the most efficient and economical operation can be carried out with recovery of essentially 100% of the free 2,6-DMN.

After the repulping the final purity of the 2,6-DMN crystals is 96–98% with the principal impurity being 2,7-DMN which is in a eutectic mixture with a portion of 2,6-DMN. Analysis of the product of Run 1 gave:

TABLE III

| | Wt. percent |
|---|---|
| 2,6-DMN | 97.8 |
| 2,7-DMN | 2.2 |
| Nitrogen | 0.10 |

| | P.p.m. |
|---|---|
| Sulfur | 16 |
| Chloride content | 68 |
| Iron | 31 |
| Copper | 3 |
| Chromium | 5 |
| Nickel | 1 |

The invention claimed is:

1. In the process of recovering 2,6-dimethylnaphthalene from a feed containing 2,6-dimethylnaphthalene and 2,7-dimethylnaphthalene by crystallizing the 2,6-dimethylnaphthalene from said feed at a temperature in the range of −50 to 70° C. wherein the improvement comprises carrying out said crystallization at the temperature determined from FIG. 2 at which the 2,6-/2,7-dimethylnaphthalene eutectic mixture is soluble in the liquid present.

2. The process according to claim 1 wherein the feed is catalytic gas oil distillate fraction having a boiling range of approximately 490–515° F.

3. The process according to claim 2 wherein the feed is at a temperature of 80–120° F. prior to crystallization.

4. The process according to claim 2 wherein the boiling range is approximately 495–510° F. and the temperature of the feed prior to crystallization is in the range of 100–120° F.

5. The process according to claim 4 wherein at the temperature of crystallization the feed has a supersaturation in the range of about 2.0–2.6 pounds/1000 gal. of feed.

6. The process according to claim 5 wherein the crystallization period is 2 to 7 hours.

7. The process according to claim 5 wherein the feed at 80–120° F. is admixed with agitated feed at the crystallization temperature.

References Cited

UNITED STATES PATENTS

| 1,836,211 | 12/1931 | Weiland et al. | 260—674 |
| 1,917,822 | 7/1933 | Britton et al. | 260—674 |
| 2,428,102 | 9/1947 | Swietoslawski | 260—674 |
| 2,790,018 | 4/1957 | Bennett | 260—674 |
| 3,249,644 | 3/1966 | Hahn | 260—668 |
| 3,485,885 | 12/1969 | Peterkin et al. | 260—674 |

DELBERT E. GANTZ, Primary Examiner

C. E. SPRESSER, JR., Assistant Examiner

U.S. Cl. X.R.

62—58